United States Patent [19]
Heim

[11] 3,781,733
[45] Dec. 25, 1973

[54] LOW HEAT CONDUCTANT TEMPERATURE STABILIZED STRUCTURAL SUPPORT

[75] Inventor: Joseph R. Heim, Batavia, Ill.

[73] Assignee: The United States of America as represented by the United States Atomic Energy Commission, Washington, D.C.

[22] Filed: Dec. 21, 1972

[21] Appl. No.: 317,454

[52] U.S. Cl. ............................ 335/216, 248/DIG. 1
[51] Int. Cl. .............................................. H01f 7/22
[58] Field of Search ................. 335/216; 248/DIG. 1

[56] References Cited
UNITED STATES PATENTS

| | | | |
|---|---|---|---|
| 3,389,353 | 6/1968 | Kafka et al. | 335/216 |
| 3,480,895 | 11/1969 | Albrecht et al. | 335/216 X |
| 3,517,730 | 5/1970 | Kassner | 335/216 |

*Primary Examiner*—George Harris
*Attorney*—Roland A. Anderson

[57] ABSTRACT

A low heat conductant structural support has a series of concentric and spaced tubular columns to thermally insulate and support a load above a base. The outer tubular column is vertically mounted on and may be thermally insulated from the base while the supported load is supported on and may be thermally insulated from the upper rim of the inner column. Intermediate columns join the upper rim of the outer column to the lower rim of the inner column. The columns of the support can be composed of materials such that the over-all thermal contraction of the intermediate columns is equal to the sum of the thermal contraction of the inner and outer columns so that, consequently, the over-all height of the support and correspondingly the distance between the supported load and the base is the same after the temperature has been decreased.

7 Claims, 4 Drawing Figures

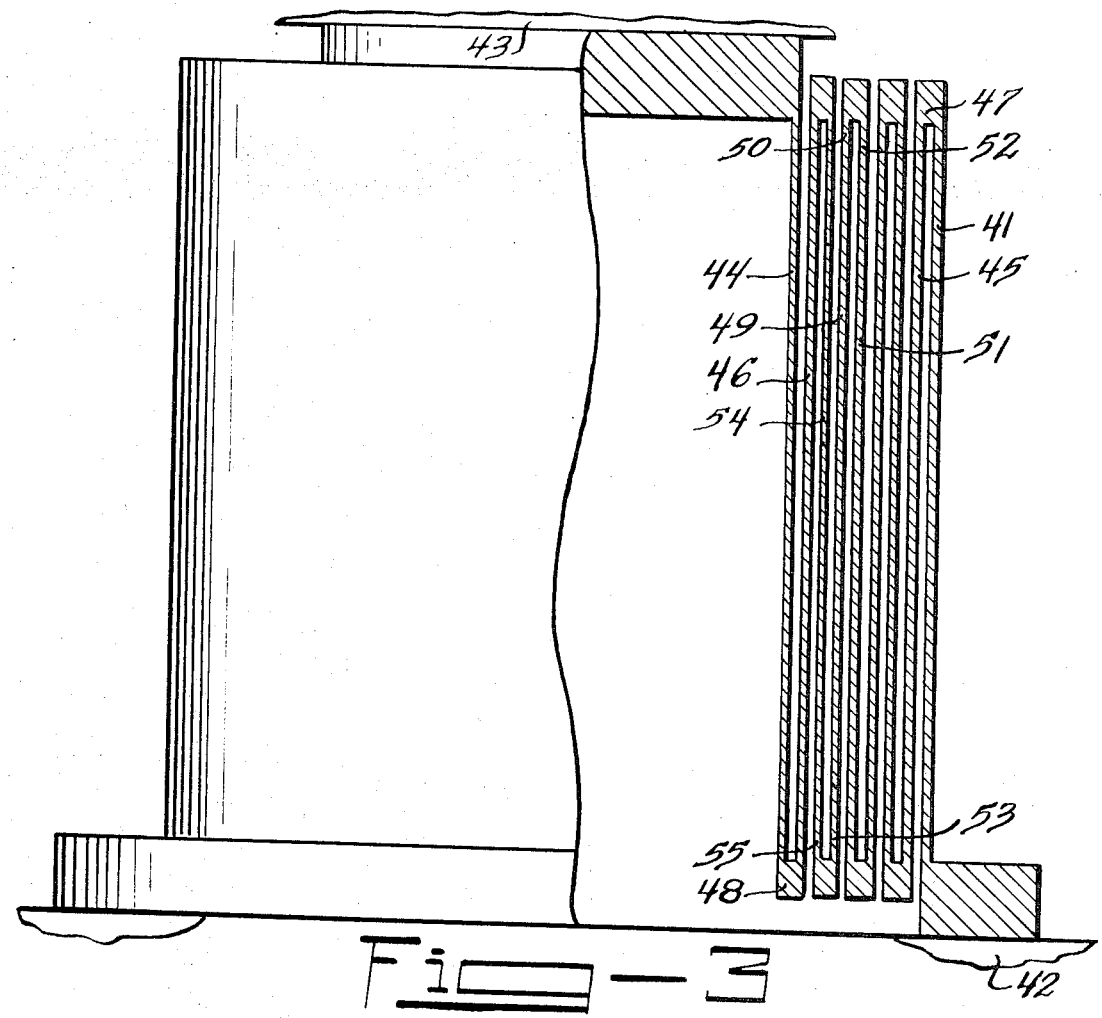
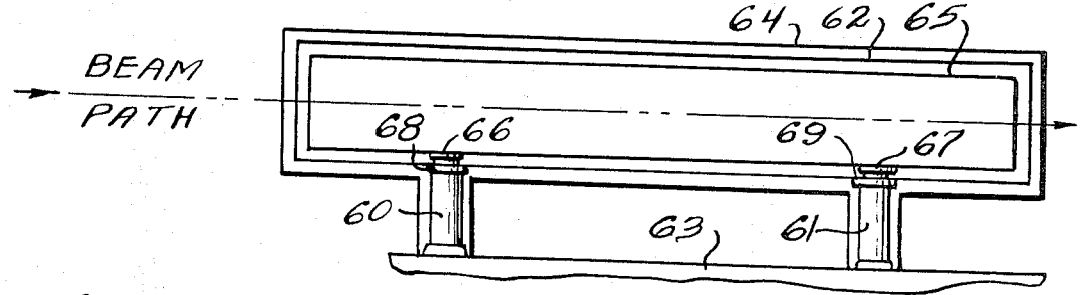
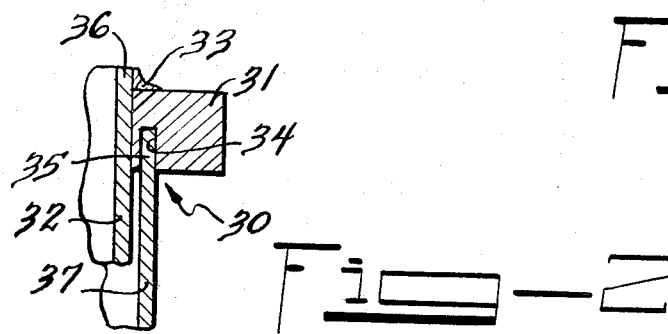

3,781,733

LOW HEAT CONDUCTANT TEMPERATURE STABILIZED STRUCTURAL SUPPORT

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates generally to a structure for supporting a load above a base and is primarily concerned with supporting and insulating a cryogenic container above a base. In particular, the invention is intended to provide support for a liquid helium chamber surrounding the coils of a superconducting electromagnet. More particularly, the invention is directed toward supporting the liquid helium chamber of a superconducting magnet in a high energy particle accelerator.

Most superconducting magnet coils operate in a liquid helium environment at temperatures near 4°K. Since the operating efficiency of these devices is directly related to the heat transferred into the helium pool, much design effort is devoted to minimizing heat leaks. One of the major heat leak paths for a large superconducting magnet is the primary structure which supports the cold mass. It is highly desirable to provide primary support structure which will permit as minimal heat leak as is possible. The alignment in a superconducting magnet is also an important concern. Since superconducting magnets require operating with a liquid helium environment at temperatures near 4°K., the thermal contraction of the materials in the support structure becomes significant. In particular, in applications of superconducting magnets to high energy particle accelerators, alignment is especially important and the thermal contraction of materials as the liquid helium is introduced and the temperature is decreased from room temperature to about 4°K. is a critical concern to proper alignment. Since proper alignment is far less difficult to achieve at room temperatures than after the magnets have been cooled to liquid helium temperatures, it would be very advantageous to have a support which would not alter the alignment when cooled down to near 4°K.

It is an object of the present invention to provide such a support in order that the over-all height of the support does not change when the magnet is cooled to liquid helium temperatures and consequently to permit alignment at room temperatures.

It is another object of the present invention to provide a support structure which has a very low heat leak to the helium chamber.

SUMMARY OF THE INVENTION

In accordance with the present invention, a low heat conductant structural support thermally insulates and supports a load above a base. The support is composed of a series of concentric and spaced tubular columns. The outer tubular column is vertically mounted on the base while the supported load is supported on the upper rim of the inner column and thereby thermally insulated from the base. An odd number of connected intermediate tubular columns join the upper rim of the outer column to the lower rim of the inner column. The columns of the support can be composed of materials such that the over-all thermal contraction of the collective intermediate columns is equal to the sum of the thermal contraction of the inner and outer columns. Consequently, the over-all height of the support and correspondingly the distance between the supported load and the base is the same after the temperature has been decreased. One specific embodiment consists of three tubular columns with one intermediate column joined to the outer column about the circumference of their upper rims and joined to the inner column about the circumference of these two columns' lower rims. For this embodiment with one intermediate column, the thermal contraction of the one intermediate column equals the sum of the thermal contractions of the inner and outer columns.

BRIEF DESCRIPTION OF THE DRAWINGS

Advantages of the present invention will become apparent upon reading the following description of the invention and with reference to the drawings, in which:

FIG. 2 is a sectional view of a joint between columns in accordance with one embodiment of the present invention.

FIG. 3 is an illustration partially in section of a support having multiple intermediate columns in accordance with the present invention.

FIG. 4 is an illustration of an application of the support in accordance with the present invention.

DESCRIPTION OF THE INVENTION

Figure 1:
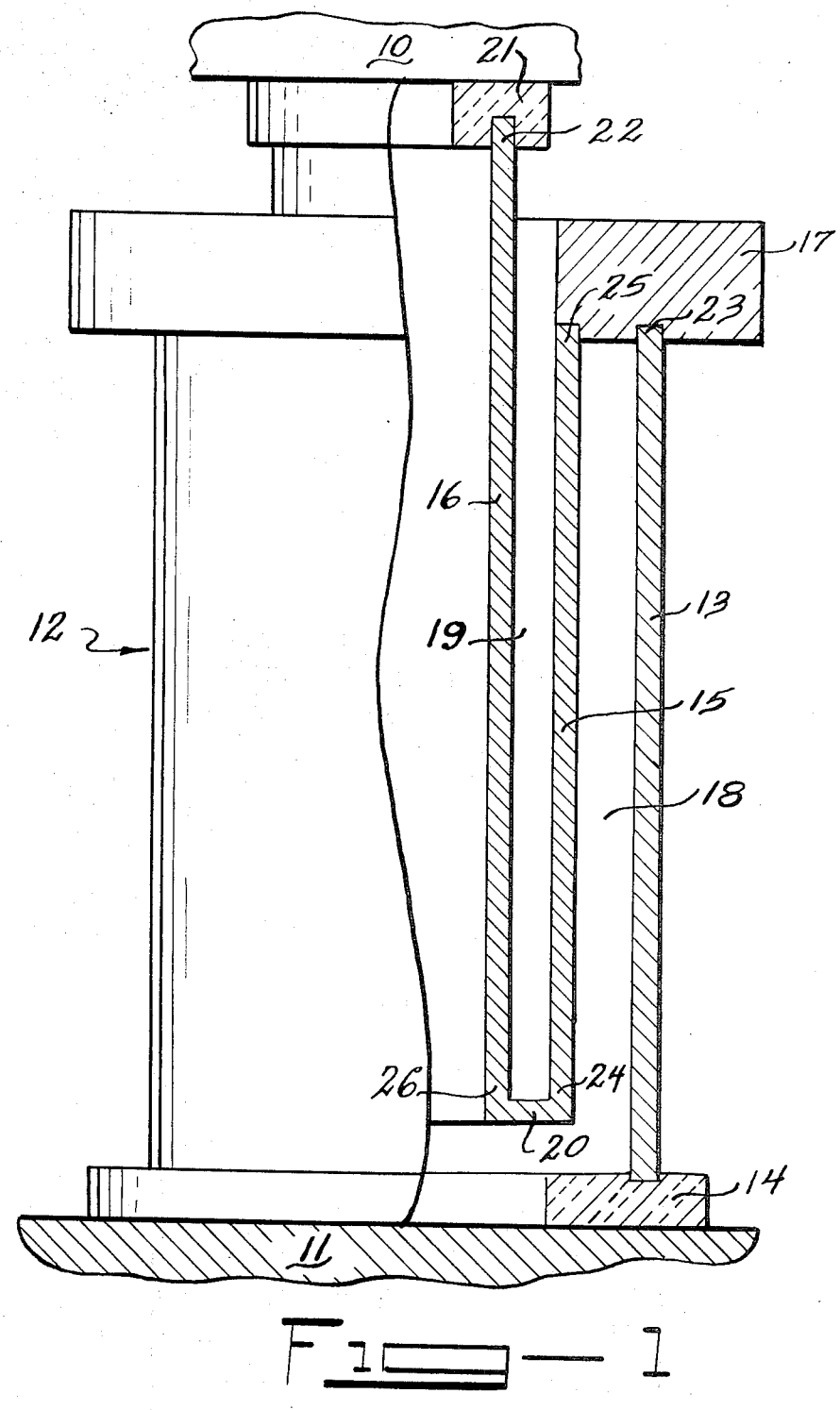
FIG. 1 is an elevational view partially in section of a three tubular columned support in accordance with the present invention.

Referring to FIG. 1 for a description of one embodiment of a structural support in accordance with the present invention, there is shown a load 10 supported above a base 11 by a three column structural support indicated generally at 12. The load 10 may be a cryogenic container such as a liquid helium chamber containing the coils of a superconducting electromagnet while the base 11 may be the outer wall of the electromagnet or the vacuum jacket wall. An outer tubular column 13 is vertically mounted on base 11 and may be thermally insulated therefrom as by insulating material 14. Intermediate tubular column 15 lies within and concentric to outer column 13, the columns being spaced so as to provide an insulating space 18 between outer column 13 and intermediate column 15. Intermediate column 15 and outer column 13 are joined together by a joint 17 which extends about the entire circumference of the two columns' respective upper rims 25 and 23. An inner tubular column 16 is concentrically disposed within intermediate column 15, these two columns also being spaced from one another so as to provide an insulating space 19 between the two columns 15 and 16. Inner column 16 and intermediate column 15 are joined together by a joint 20 which extends about the entire circumference of the lower rims 24 and 26 of columns 15 and 16, respectively. The load 10 is supported on the upper rim 22 of inner column 16 and may be thermally insulated therefrom as by insulating material 21.

The load 10 is supported above base 11 by structural support 12 which also serves to provide insulation between the load 10 and the base 11 as a result of the insulating properties of the materials from which the columns are composed. Additional insulation between the load 10 and the base 11 can be obtained by the use of insulating material 21 and insulating material 14. Further insulation results from the increased heat leak path length present in the composite tubular column structure. Since any principal heat leak must traverse the entire length of each of the three columns, the path length is much greater than the distance between the load 10 and the base 11, being almost three times greater in this instance. Insulating spaces 18 and 19 provide insulation between the spaced columns such that the only conduction heat leak path is along the entire length of all the columns. Since the support 12 would lie between the cryogenic container and the outer wall of the superconducting electromagnet, the columns would be surrounded by a vacuum and spaces 18 and 19 would correspondingly be evacuated, thereby providing very good insulation between columns.

In an application to superconducting magnets where the outer wall or base 11 may be at room temperature and the cryogenic container or load 10 at liquid helium temperature of approximately 4°K., it may be desirable to also heat sink a portion of the structural support. This can readily be done by having the joint 17 between the outer column 13 and the intermediate column 15 thermally sinked to a liquid nitrogen cooled radiation shield at about 77°-78°K.

Referring to FIG. 4, there is illustrated a superconducting electromagnet in a particle accelerator supported by two column supports in accordance with the present invention. The two supports 60 and 61 are mounted on the floor 63 in the present instance, the portions of floor 63 under and immediately around supports 60 and 61 serving as portions of the vacuum jacket 64 which surrounds the entire magnet structure and columns 60 and 61. The liquid helium chamber 65 surrounding the magnet coils is supported on the upper rims 66 and 67 of the inner columns of column supports 60 and 61 respectively. The joints 68 and 69 between the intermediate columns and the outer columns of supports 60 and 61 respectively are thermally sinked to liquid nitrogen cooled radiation shield 62.

In the application of the structural support to supporting the liquid helium chamber of a superconducting electromagnet in a high energy particle accelerator, proper alignment is a very important concern. Alignment at room temperature is possible with the present invention since the over-all height of the support and correspondingly the distance between the supported load and the base remains the same as the temperature is decreased. Therefore, the alignment is not altered, as the over-all height of the support is the same at room temperature as when the liquid helium has been introduced into the chamber and the temperature has cooled down to about 4°K. The individual tubular columns may, of course, be made from different materials with correspondingly different thermal expansion coefficients. By proper selection of the materials for the various columns in the support with appropriate consideration given to their thermal expansion coefficients, a support can be constructed which will have an increased over-all height when the temperature has been lowered or which will have a decreased over-all height when the temperature has been lowered as well as the support in which the over-all height is the same. Since a decrease of the intermediate column tube length would tend to increase the over-all column height whereas a decrease of the tube length of either the inner column or the outer column would tend to decrease the over-all column height, the columns of this support are composed of materials selected such that the thermal contraction of the intermediate column is equal to the sum of the thermal contractions of the inner and outer columns. If insulating material, such as insulating material 14 between the column and the base and insulating material 21 between the column and the load, is employed, the thermal contraction of this insulating material will of course be taken into account. Therefore, since the net effect is that the over-all support height will not change when the column is cooled down to operating conditions, all alignments may be done when the magnet is installed, and the alignments will not be lost when the magnet is cooled down. For superconducting magnet coil support applications an excellent combination of inexpensive materials may be selected which satisfies temperature and thermal contraction considerations and also has low heat conduction. One or more of tubular columns of the support are composed of an insulating material in order to impart insulating properties to the support as a whole and thereby provide insulation between the load and the base. Since the low heat leak feature of the composite column support is directly related to the thermal conductivity of the material chosen for the inner tube, it is particularly important that the inner tubular column be composed of an insulating material in order to limit the heat transferred to the helium chamber. As an example, both the inner and outer columns can be made of epoxy fiberglass cloth laminates while the intermediate column is made of aluminum. These materials are especially suitable since both are readily available in a wide variety of tube sizes.

EXAMPLE

A three column structural support in accordance with the present invention was constructed using 6061 aluminum in the T6 condition for the intermediate column and National Electrical Manufacturers Association Standard G-10 epoxy fiberglass for both the inner and outer columns. The total support height was 36 centimeters at room temperature with the outer column having an outer diameter of 11 centimeters. Both G-10 tubes had a 0.16 cm wall thickness while the aluminum tube had a wall thickness of 0.32 cm to assure good tube-to-flange welds. Aluminum flanges were machined with 0.6 cm deep grooves to accept the G-10 columns and a flange was welded to each end of the aluminum tube to form the joints between the columns. Referring to FIG. 2, there is shown a typical joint for these materials. The joint indicated generally at 30 has an aluminum flange 31 joined to aluminum column 32 about the circumference of the rim 36 of column 32 by a weld 33. The flange 31 contains a groove 34 into which the rim 35 of the epoxy fiberglass column 37 is inserted. The columns are further bonded together at the joint with a low temperature epoxy. In the present example, all aluminum bonding surfaces were chemically etched with a sodium dichromate sulfuric acid solution while the G-10 bonding surfaces were lightly sanded and wiped with a cleaning agent prior to bonding with epoxy. The aluminum to G-10 joints were bonded together with low temperature Narmco 3170 epoxy resin with 7133 curing agent supplied by Crest Products Company. After curing, the flange surfaces were final-machined perpendicular to the column axis. The support was tested, taking a support free height measurement prior to filling with liquid nitrogen and helium. After the introduction of cryogens, support height, temperature, and helium boil-off measurements were taken periodically for several days. The final results showed a maximum temperature differential along the intermediate tube of 1.5°K. with a total helium boil-off of 0.11 liquid liters per hour. The sample was sized to carry a 1000-kg axial load at 4°K. with a heat leak of less than 11 milliwatts and was found to have a collapse load of 9,000 kg. The height after steady state was reached was identical to the room temperature height. After warm-up, the support height was again measured and no change was observed.

For many cryogenic support applications, it may be more desirable to use a support consisting of many columns rather than only three columns. For example, it may not be possible to employ the liquid nitrogen radiation shield or the space available for the support structure may be limited. In such event, the heat leak path length can be increased by using many columns, the columns being of shorter length if necessary. Referring to FIG. 3, there is illustrated a structural support composed of nine concentric columns. Since the outside tubular column 41 is mounted on the base 42 while the load 43 is supported on the upper rim of the inside column 44, an odd number of intermediate tubular columns are necessary to properly join the series of concentric columns. As can be seen from FIG. 3, the outermost intermediate column 45 is joined to the outside column 41 about the circumference of the upper rims of the two columns at joint 47. The innermost intermediate column 46 is joined to the inside column 44 about the circumference of the lower rims of these two columns at joint 48. Taking intermediate column 49 as an example of each and all intermediate columns, it can be seen that each intermediate column 49 is joined about the circumference of the rim on one end 50 to the immediately outer column 51 about the circumference of the rim on its corresponding end 52, ends 50 of column 49 and 52 of column 51 being upper ends in the present example. Each intermediate column 49 is also joined about the circumference of the rim on the opposite end 53 to the immediately inner column 54 about the circumference of the rim on its corresponding end 55, ends 53 of column 49 and 55 of column 54 being lower ends in this case.

In the case of a support with a multiple number of intermediate columns, in order for the over-all height of the support and correspondingly the distance between the supported load and the base to be the same at room temperature as when the temperature is decreased to liquid helium temperatures, the columns are composed of materials such that the resultant thermal contraction of the over-all height of the intermediate columns due to the collective thermal contractions of all intermediate columns is equal to the sum of the thermal contractions of the inside and outside columns. Here the over-all height of the intermediate columns can be defined as that vertical distance from the upper rim of the outermost intermediate column to the lower rim of the innermost intermediate column. Referring to FIG. 3, it can be seen that the over-all height of the intermediate columns is the vertical distance between joint 47 and joint 48. It should be apparent that a decrease in this over-all height of the intermediate columns tends to increase the height of the support such that if this decrease in the intermediate column height equals the sum of the decrease in height of the inside and outside columns the net effect will be no change in the over-all height of the support.

The embodiments of the invention in which an exclusive property or privilege is claimed are defined as follows:

1. A low heat conductant structural support wherein:
   a. an outer tubular column is vertically mounted on a base;
   b. an intermediate tubular column is concentrically disposed within and spaced from said outer column, said intermediate column and said outer column being joined together about the circumference of the upper rims of said two columns;
   c. an inner tubular column is concentrically disposed within and spaced from said intermediate column, said inner column and said intermediate column being joined together about the circumference of the lower rims of said two columns; and
   d. a supported load is attached to the upper rim of said inner column, whereby the load is supported above and thermally insulated from said base.

2. The structural support of claim 1 wherein the support is temperature stabilized in that the columns are composed of materials such that the thermal contraction of the intermediate column is equal to the sum of the thermal contractions of the inner and outer columns whereby the over-all height of the support and correspondingly the distance between the supported load and the base remains constant as the temperature is decreased.

3. The structural support of claim 2 wherein said base is an outer wall of a superconducting electromagnet and said supported load is a liquid helium chamber containing the coils of the superconducting electromagnet.

4. The structural support of claim 3 wherein the outer wall of the electromagnet is approximately at room temperature, the liquid helium chamber is at approximately 4°K., and the joint between the outer and intermediate columns is thermally sinked to a liquid nitrogen cooled radiation shield at about 78°K.

5. The structural support of claim 4 wherein the intermediate column is made of aluminum and both the inner and outer columns are made of epoxy fiberglass cloth laminated tubes.

6. A low heat conductant structural support comprising: an outside tubular column vertically mounted on a base; an odd number of intermediate tubular columns concentrically disposed within and spaced from said outside column and spaced from each other; the outermost intermediate column and said outside column being joined together about the circumference of the upper rims of said two columns; an inside tubular column concentrically disposed within and spaced from the innermost intermediate column, said inside column and said innermost intermediate column being joined together about the circumference of the lower rims of said two columns; each of said intermediate columns being joined about the circumference of the rim on one end to the immediately outer column about the circumference of the rim on its corresponding end and being joined about the circumference of the rim on the opposite end to the immediately inner column about the circumference of the rim on its corresponding end; the supported load being attached to the upper rim of said inside column and thereby supported above and thermally insulated from said base.

7. The structural support of claim 6 wherein the support is temperature stabilized in that the columns are composed of materials such that the resultant thermal contraction of the over-all height of the intermediate columns due to the collective thermal contractions of all intermediate columns is equal to the sum of the thermal contractions of the inside and outside columns whereby the over-all height of the support and correspondingly the distance between the supported load and the base remains constant as the temperature is decreased.

* * * * *